3,111,456
WOOD PRESERVATIVES

Harry Hochman, Woodland Hills, and Thorndyke Roe, Jr., and Harold P. Vind, Oxnard, Calif., assignors to the United States of America as represented by the Secretary of the Navy
No Drawing. Filed June 8, 1961, Ser. No. 115,827
6 Claims. (Cl. 167—38.6)
(Granted under Title 35, U.S. Code (1952), sec. 266)

The invention described herein may be manufactured and used by or for the Government of the United States of America for governmental purposes without the payment of any royalties thereon or therefor.

This invention relates to preservative materials for the preservation and protection of wooden structures in a marine environment.

The destructive action of marine boring organisms on wooden structures submerged in sea water presents a major maintenance problem to industrial and military installations. The replacement of wood pilings destroyed by these organisms is a costly operation and, in addition, usually removes the waterfront installation from operation during the reconstruction period.

Throughout the modern history of man's battle against marine organisms, the mainstay of defense has been in creosote and creosote-coal tar combinations. The principal reason for the success of creosote as a preservative of marine structures is that it is very toxic to marine borers and possibly to other marine organisms. Some of the other chemicals that have been used to preserve marine pilings are more toxic per unit weight but these need to be diluted with a solvent carrier before they can be used to treat wood. Creosote, on the other hand, being a liquid needs no solvent and may be stored undiluted within the hollow sapwood cells of the timbers. Furthermore, creosote costs less than any other toxic agent, per unit killing power, and hence its continued use is economically indicated.

While the foregoing remarks are generally applicable to pure and properly prepared creosote, many grades of creosote furnished have varying rates of toxicity depending on their preparation and purity. Thus, the specifications for creosote and creosote solutions are concerned chiefly with the boiling point range of the material, the quantities of the fractions distilling in certain boiling point ranges, and the specific gravity of these fractions. No concern seems to be given to the carbonization temperature at which the material was processed, the removal of any of its constituents, nor the addition of materials to the product. The materials sold and received under the name "creosote" may vary greatly in chemical composition and, therefore, in their ability to preserve wood.

In the general run, therefore, it has been found that creosote and creosote solutions are not completely effective in deterring attack by all types of marine wood-boring organisms. Crustacean borers can attack the outer treated area of a pile to a point where the inner untreated area is exposed. Then attack by molluscan borers can occur and the pile is destroyed in a relatively short time.

Notwithstanding the foregoing remarks as to the general use and effectiveness of pure and properly prepared creosote and its economic preferability, it was considered that the entire problem was of sufficient economic importance to develop a preservative which was effective against all marine borers and could be applied to the wooden members of the main structure as effectively and efficiently as had been creosote in the past. Such preservatives, the subjects of the present invention, can be made up with known quantities of materials so that the compounds or products are always uniform and their effectiveness can be predicted.

Many chemicals have been tested for toxicity with relation to all known forms of marine borer organisms. Some chemicals are toxic to one or two species and are not toxic toward another. Other factors than toxicity must also be considered in this matter. Volatility, solubility in sea water, and affinity for wood fibers are also of prime importance. Thus, it is unlikely that the ratings assigned to a group of poisonous compounds in a toxicity test would resemble the ratings assigned to the same compounds in a test of their effectiveness in protecting wood from a marine borer attack.

In order to arrive at the compounds herein after set forth, length and exhaustive experimentation was conducted along the following lines:

(a) Assays of toxicity were conducted with several hundred substances in order to determine by laboratory methods which substances were toxic to one or the other or all of the principal marine borer organisms, i.e., Limnoria, Teredo larvae, and Martesia, and which could be eliminated from further consideration.

(b) Small samples of wood were then prepared with one or the other of the substances found toxic to marine borers, or combinations thereof, and exposed to the action of live organisms, singly and in combination. This phase involved choice and selection of the various solvents which could be used with one or the other of the toxic substances, or combinations thereof, and the best mode of application to the various woods which were sampled from all those woods known to be best suited for marine construction. The various factors, previously mentioned, of the volatility, solubility in sea water, resistance to leaching, the affinity of the toxic substance in its carrier-solvent for the wood fibers, and the ease and mechanics of the penetration of the compound into the wood were also studied and observed.

(c) The next step involved the use of small wood panels of the various kinds of wood impregnated with the various compounds in an actual marine environment, both local and foreign. This method of approach to the problem provides a system for rapidly screening and testing large numbers of potentially useful treatments. The panels can be treated in ordinary laboratory equipment, required relatively small quantities of treating materials and a large number of treatments can be exposed in a relatively small dock or test area. In addition, the surface-to-volume ratio of these panels is so high that the rate of leaching of the preservative by the sea water is much higher than it would be in round piling sections.

(d) The final step is the treatment of the wooden members of full size marine structures. Such tests have been and are being conducted with great success in the use of the toxic preservatives hereinafter set forth.

From among the very many toxic substances and compounds thereof screened and tested as above described, the following creosote-free preservatives have been found most effective against all known forms of wood-boring marine organisms:

Example I

| | Parts |
|---|---|
| Copper naphthenate (6% Cu) | 16 |
| Crystal violet or malachite green oxalate or tributyltin oxide or tributyltin coconut fatty acid salt | 1 |
| Cellosolve | 84 |

Example II

| | Parts |
|---|---|
| Chlordan or Dieldrin or Toxaphene | 1 to 5 |
| Crystal violet or malachite green oxalate or tributyltin oxide or tributyltin coconut fatty acid salt | 1 to 5 |
| Cellosolve | 100 |

*Example III*

| | Parts |
|---|---|
| Copper acetate or copper sulfate | 2 to 5 |
| Crystal violet or malachite green oxalate | 2 |
| Water | 100 |

The proportions set forth in the examples above are parts by weight. The wooden members may be treated to standard retentions.

Having thus described our invention of creosote-free wood preservatives effective against all known forms of marine wood-boring organisms, particularly those species recognized as Limnoria, Teredo, and Martesia, we claim:

1. A wood preservative for the protection of wooden structures in a marine environment against the attack of marine wood-boring organisms consisting of copper naphthenate having 6% copper, 16 parts by weight; crystal violet, 1 part by weight; and Cellosolve, 84 parts by weight.

2. A wood preservative for the protection of wooden structures in a marine environment against the attack of marine wood-boring organisms consisting of copper naphthenate (6% Cu), 16 parts by weight; malachite green oxalate, 1 part by weight; and Cellosolve, 84 parts by weight.

3. A wood preservative for the protection of wooden structures in a marine environment against the attack of marine wood-boring organisms consisting of copper naphthenate (6% Cu), 16 parts by weight; tributyltin oxide, 1 part by weight; and Cellosolve, 84 parts by weight.

4. A wood preservative for the protection of wooden structures in a marine environment against the attack of marine wood-boring organisms consisting of copper naphthenate (6% Cu), 16 parts by weight; tributyltin coconut fatty acid salt, 1 part by weight; and Cellosolve, 84 parts by weight.

5. A wood preservative for the protection of wood used in a marine environment comprising a compatible composition of chemical toxicants effective against marine borer organisms, particularly Limnoria, Teredo, and Martesia, and a solvent carrier therefor for impregnating said toxicants into said wood, said toxicants and solvent-carrier being selected to form a preservative composition relatively insoluble in sea water, said compatible composition consisting of 16 parts by weight of copper naphthenate having 6% copper; 1 part by weight of one of the group consisting of crystal violet, malachite green oxalate, tributyltin oxide and tributyltin coconut fatty acid salt; and 84 parts by weight of Cellosolve.

6. A wood preservative for the protection of wood used in a marine environment comprising a compatible composition of chemical toxicants effective against marine borer organisms, particularly Limnoria, Teredo, and Martesia, and a solvent carrier therefor for impregnating said toxicants into said wood, said toxicants and solvent-carrier being selected to form a preservative composition relatively insoluble in sea water, said compatible composition of chemical toxicants consisting of 1 to 5 parts by weight of one of the group consisting of Chlordan, Dieldrin, Toxaphene, copper acetate and copper sulphate; 1 to 5 parts by weight of one of the group consisting of crystal violet, malachite green oxalate, tributyltin oxide and tributyltin coconut fatty acid salt; and 100 parts by weight of a solvent-impregnator taken from the group consisting of Cellosolve and water.

References Cited in the file of this patent

UNITED STATES PATENTS 1,988,177    Merrill _____ Jan. 15, 1935

OTHER REFERENCES

Chemical Abstracts, volume 41, entry 2527a, 1947 (citing Loeffler et al., J. Econ. Entomol., 39, 589–97, 1947).

Chemical Abstracts, volume 43, entry 4804h, 1949 (citing Berk, Ind. Eng. Chem., 41, 627–33, 1949).

Chemical Abstracts, volume 44, entry 285f, 1950 (citing Madsen, Dansk Tids. Farm., 23, 208–21, 1949).

Chemical Abstracts, volume 52, entry 3245b, 1958 (citing Adlung et al., Z. Angew, Zool., 1956, 301–5).

Chemical Abstracts, volume 54, entry 22714h, 1949 (citing British Patent 797,073, June 25, 1953).